United States Patent
Morley-Smith et al.

(10) Patent No.: US 11,995,506 B2
(45) Date of Patent: May 28, 2024

(54) ASSISTIVE DETECTION OF VISUAL STATES FOR MONITORING DEVICES

(71) Applicant: ZEBRA TECHNOLOGIES CORPORATION, Lincolnshire, IL (US)

(72) Inventors: James Roger Morley-Smith, Buckinghamshire (GB); Cameron James Smith, Whitchurch (GB); Hannah Marie Legg, Belvedere (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 59 days.

(21) Appl. No.: 17/828,634

(22) Filed: May 31, 2022

(65) Prior Publication Data

US 2023/0385573 A1 Nov. 30, 2023

(51) Int. Cl.
*G06K 7/10* (2006.01)
*G06K 7/14* (2006.01)
*G06V 10/25* (2022.01)

(52) U.S. Cl.
CPC ....... *G06K 7/10722* (2013.01); *G06K 7/1413* (2013.01); *G06K 7/1417* (2013.01); *G06V 10/25* (2022.01)

(58) Field of Classification Search
CPC .......................... G06K 7/10722; G06V 10/25
USPC .................................................. 235/462.11
See application file for complete search history.

(56) References Cited

U.S. PATENT DOCUMENTS

2013/0037605 A1* 2/2013 Cok ................... G06F 16/9554
235/375
2021/0034831 A1* 2/2021 Abdo ....................... G01K 3/04

* cited by examiner

*Primary Examiner* — Toan C Ly (57) ABSTRACT

A method in a computing device includes: capturing, via a camera of a computing device, an image of a monitoring device including a sensor, the sensor presenting an active one of a set of predefined visual states; detecting, within the image, a machine-readable indicium disposed on the monitoring device; determining, from the machine-readable indicium, a state detection parameter; selecting, according to the state detection parameter, at least portion of the image containing the sensor and determining the active state presented by the sensor; controlling an output assembly of the computing device to present a handling notification based on the determined active state.

18 Claims, 8 Drawing Sheets

ASSISTIVE DETECTION OF VISUAL STATES FOR MONITORING DEVICES

BACKGROUND

Monitoring devices, sometimes also referred to as trackers or tracking devices, can be affixed to items such as biological materials, medications, and the like, to monitor environmental conditions to which such items are subjected. For example, affixing a monitoring device to an item prior to transportation of the item enables the monitoring device to detect whether the item is subjected to excessive heat during transit. The visual appearance of the monitoring device may change based on environmental conditions to which the device (and therefore the item) is exposed. Under some conditions, however, detection and/or interpretation of the state of the monitoring device may be challenging, and the item may therefore be incorrectly handled.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device including: capturing, via a camera of a computing device, an image of a monitoring device including a sensor, the sensor presenting an active one of a set of predefined visual states; detecting, within the image, a machine-readable indicium disposed on the monitoring device; determining, from the machine-readable indicium, a state detection parameter; selecting, according to the state detection parameter, at least portion of the image containing the sensor and determining the active state presented by the sensor; controlling an output assembly of the computing device to present a handling notification based on the determined active state.

Additional examples disclosed herein are directed to a computing device, comprising: a camera; an output assembly; and a processor connected with the camera and the output assembly, the processor configured to: capture, via the camera, an image of a monitoring device including a sensor, the sensor presenting an active one of a set of predefined visual states; detect, within the image, a machine-readable indicium disposed on the monitoring device; decode, from the machine-readable indicium, a state detection parameter; select, according to the state detection parameter, at least a portion of the image containing the sensor and determining the active state presented by the sensor; control the output assembly to present a handling notification based on the determined active state.

Figure 1:
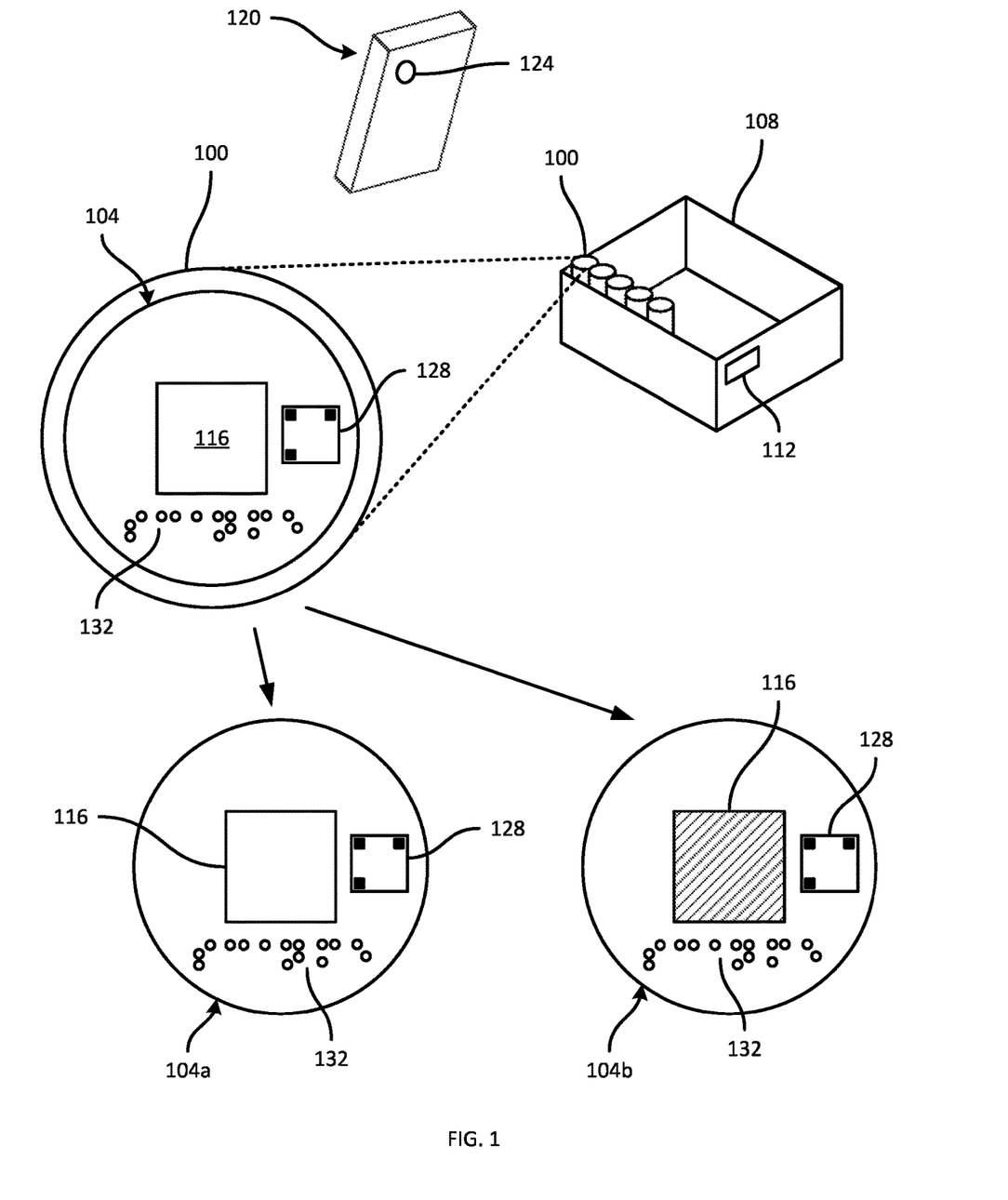
FIG. 1 is a diagram illustrating a system for monitoring environmental conditions.

FIG. 1 illustrates a system for monitoring environmental conditions, e.g., during transportation and/or storage, of one or more items 100. The items 100, in this example, are vials, bottles, or the like, which may contain any of a wide variety of materials. For example, the items 100 can contain a vaccine, reagents, biological tissue or fluid samples, or the like. As will be apparent to those skilled in the art, the items 100 need not be vials or bottles as set out above. Other example items include bags (e.g., containing biological material such as donor blood, or the like), packages of medication (e.g., boxes, blister packs, or the like), and so on. More generally, the items 100 contain materials that may be negatively affected by environmental conditions such as temperature exceeding an upper threshold and/or falling below a lower threshold, exposure to light over a certain intensity and/or for a duration exceeding a threshold, or the like.

The items 100 may therefore require storage and/or transport in environmentally controlled containers, rooms, or the like. The items 100 are generally not under continuous human supervision, however, and may also be handled by a wide variety of entities during transit and storage. Therefore, to enable the environmental conditions to which the items 100 are subjected (and to verify that those environmental conditions comply with expected conditions in which the items 100 are to be handled), the items 100 can be provided with monitoring devices 104. In the illustrated example, each item 100 is equipped with a distinct monitoring device 104. The items 100 may be transported in a receptacle 108 such as a box or the like, which may also be equipped with a monitoring device 104 in some examples. In the illustrated example, the receptacle 108 does not carry a separate monitoring device 104, but includes a label 112 displaying or encoding (e.g., in a barcode) information such as a lot number, a count of the items 100, and the like. Each item 100 itself may therefore need not include a label distinct from the monitoring device 104 (although in some examples, each individual item 100 can also be labelled).

The monitoring device 104, one example of which is shown in an enlarged view in FIG. 1, includes a sensor 116 configured to present an active one of a set of predefined visual states, based on environmental conditions to which the sensor 116 has been exposed. For example, the sensor 116 can be a thermochromic sensor, containing temperature-sensitive pigment(s) and therefore configured to present an initial visual appearance when the sensor 116 has not been exposed to a temperature exceeding a threshold (defined by the nature of the temperature-sensitive pigment). The sensor 116 maintains the initial visual appearance unless the sensor 116 is exposed to a temperature exceeding the above-mentioned threshold (e.g., for a period of time configurable via the composition of the temperature-sensitive pigment). If the sensor 116 is exposed to a temperature exceeding the above-mentioned threshold, the sensor 116 presents a second visual appearance, e.g., by changing from an initial color to a second color. Generally, the change in visual state is irreversible.

In some examples, the sensor 116 can have more than two predefined visual states, such as an initial state and two excursion-activated states, e.g., corresponding to excessive heat and excessive cold. FIG. 1 illustrates a monitoring device 104 in an initial state 104a, in which the sensor 116 has a first color, pattern, or the like (e.g., white, clear, or any other suitable color and/or pattern) and an excursion-activated state 104b, e.g., presented following exposure of the sensor 116 to a sufficiently cold and/or hot environment. The sensor 116, in the state 104b, has a second color, pattern, or the like (e.g., red, black, or any suitable color and/or pattern distinct from the first color and/or pattern).

Based on the presented states of the monitoring devices 104, a user handling the items 100 can select appropriate handling actions for each item 100. For example, any item with a corresponding monitoring device 104 that is not in the initial state may be discarded, rejected, or the like. The states of some or all of the items 100, as indicated by their respective monitoring devices 104, may also be logged to a repository accessible by one or more computing devices, for subsequent processing. For example, a count of rejected items 100 may be logged along with the previously mentioned identifier (e.g., a unique lot identifier) encoded in the label 112. As will be apparent, a wide variety of other logging processes may also be employed, and in some examples logging may be omitted entirely.

The handling of the items 100, in other words, relies at least in part of a visual inspection of the corresponding monitoring devices 104 by one or more users (e.g., staff in a facility associated with the transportation, storage, or end-use of the items 100). However certain users may have visual impairments (e.g., colorblindness, loss of sight, or the like) that render accurate visual inspection of the sensors 116 difficult. Further, certain operating environments may have lighting conditions (e.g., low ambient light levels, colored ambient lighting, or the like) that obstruct visual inspection of the sensors 116. The sensors 116 therefore risk being inaccurately interpreted, and as a result the items 100 may be improperly handled.

The monitoring devices 104 therefore include additional features, to be discussed below in greater detail, enabling a computing device 120, such as a mobile computing device (e.g., a smart phone, a tablet computer, or the like), to implement assistive functionality for detecting and interpreting the active visual states of the monitoring devices 104. As will be discussed below, the computing device 120 implements such functionality to capture images of the monitoring devices 104, using a camera 124, and to process the images to detect and interpret the visual states of the monitoring devices 104.

The features of the monitoring devices 104 discussed herein include a machine-readable indicium 128 integrated with or otherwise affixed to each monitoring device 104. The indicium 128, e.g., provided as a QR code or other suitable barcode symbology, encodes state detection parameters that enable the computing device 120 to locate and visually assess the sensor 116. In some examples, as shown in FIG. 1, the monitoring device 104 also includes a sensory prompt 132 to signal to the user that the monitoring device 104 can be scanned with the computing device 120 for assistive state detection. In the illustrated example, the sensory prompt 132 is a tactile prompt, implemented in the form of a string of braille (e.g., reading "scan me"). The sensory prompt 132 can take other forms in addition to or instead of that shown in FIG. 1. For example, the prompt 132 can be a visual prompt such as a string of text or the like (e.g., with greater contrast than the sensor 116 relative to the background of the monitoring device 104). In some examples, the indicium 128 itself can act as a prompt, and a separate prompt such as the prompt 132 can be omitted.

Figure 2:
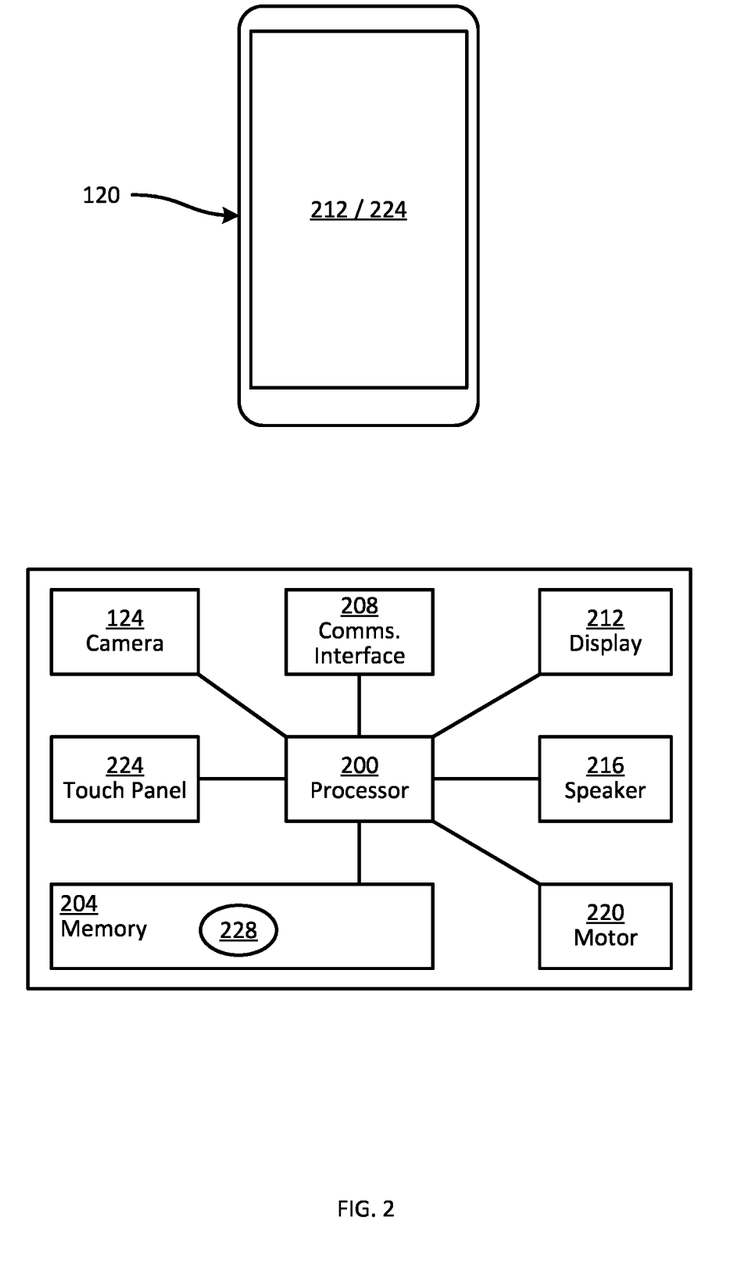
FIG. 2 is a diagram illustrating certain components of the computing device of FIG. 1.

Turning to FIG. 2, before discussing the functionality implemented by the computing device 120 in greater detail, certain components of the computing device 120 are illustrated. The computing device 120 includes a housing supporting the previously mentioned camera 124, as well as various other components. In particular, the computing device 120 includes a processor 200, e.g., in the form of one or more central processing units (CPU), graphics processing units (GPU), or dedicated hardware controllers such as application-specific integrated circuits (ASICs). The processor 200 is communicatively coupled with a non-transitory computer readable medium, such as a memory 204, e.g., a suitable combination of volatile and non-volatile memory elements. The processor 200 can also be coupled with a communications interface 208, such as a wireless transceiver enabling the computing device 120 to communicate with other computing devices via suitable network infrastructure.

The computing device 120 also includes one or more output devices, which may also be referred to as an output assembly. In the illustrated example, the output assembly of the computing device 120 includes a display 212, a speaker 216, and a motor 220 (e.g., for generating haptic output in the form of vibrations of the housing of the computing device 120). The computing device 120 further includes one or more input devices, which may also be referred to as an input assembly. In this example, the input assembly includes a touch panel 224, which may be integrated with the display 212. Various other input devices are also contemplated, such as buttons, microphones, and the like.

The memory 204 stores computer readable instructions, in the form of one or more applications, executable by the processor 200 to implement specific functionality. In the illustrated example, the memory 204 stores a state detection application 228, execution of which by the processor 200 configures the computing device 120 to detect one or more sensors 116 and determine which state the detected sensor(s) 116 are currently presenting. The computing device 120 can then generate output in the form of handling notifications, e.g., instructing an operator of the computing device 120 to discard of or reject an item 100, or the like.

Figure 3:
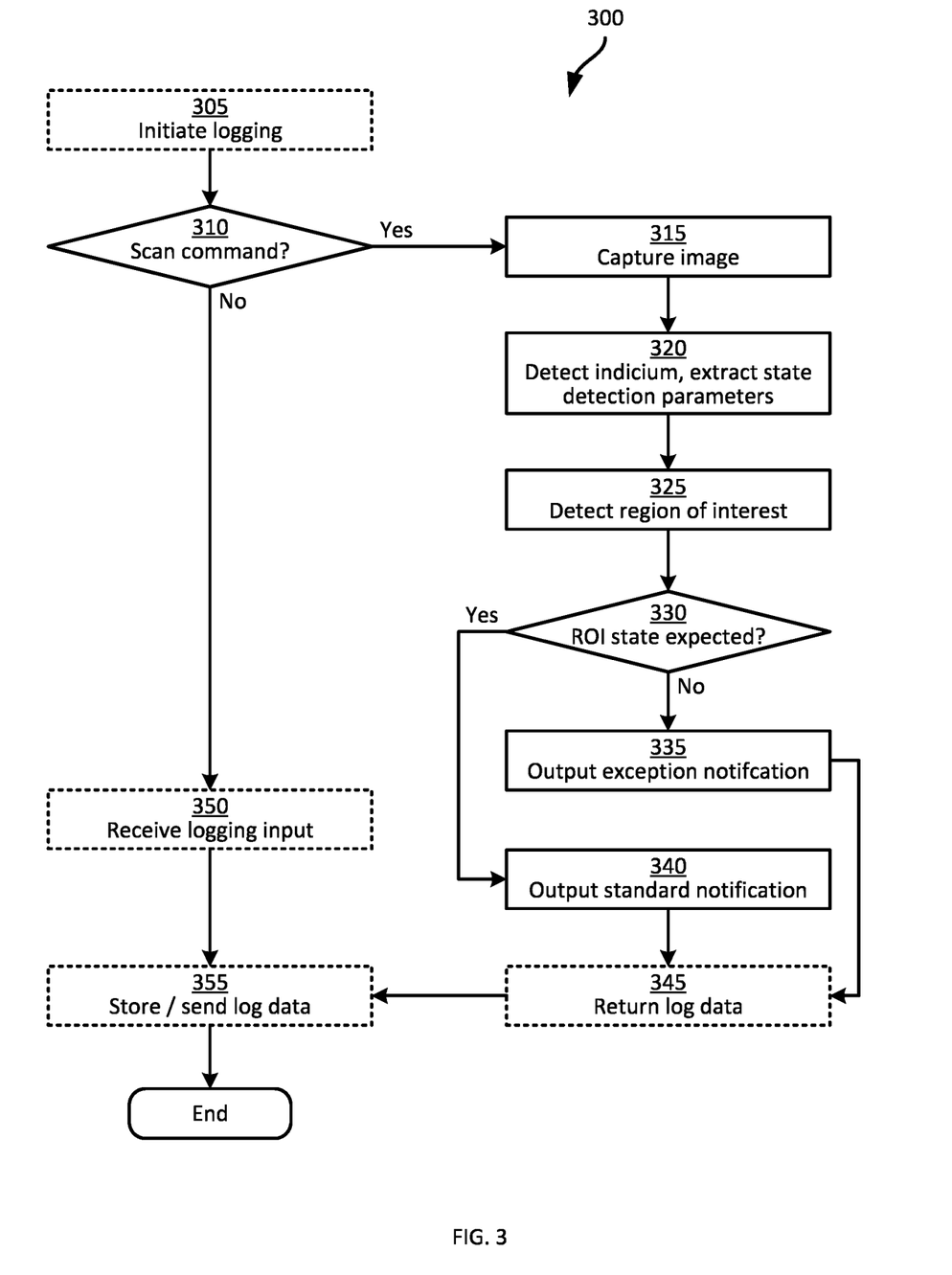
FIG. 3 is a flowchart of a method of assistive state detection.

Turning to FIG. 3, a method 300 of assistive state detection for monitoring devices is illustrated. The method 300 will be described below in conjunction with its performance by the computing device 120, although it will be understood that the method 300 can also be performed by other suitable computing devices.

At block 305, the computing device 120 can optionally initiate a logging process via execution of the application 228. For example, the computing device 120 can be configured to collect and store, and/or transmit to another computing device hosting a logging database, status data for the items 100. For example, referring briefly to FIG. 4, the computing device 120 can be configured to render an interface on the display 212 including a count 400 of rejected items 100, a count 404 of accepted items 100 associated with a lot identifier 408 (e.g., entered manually via the touch panel 224, or decoded from the label 112). The interface can also include various selectable elements, such as an accept button 412, for selection when the monitoring device 104 of a given item 100 is in the expected (e.g., initial) state, indicating compliance with expected environmental conditions during transit and/or storage. Selection of the button 412 may increment the count 404. The interface can also include a selectable reject button 416, for selection when the monitoring device 104 of a given item 100 is not in the expected (e.g., initial) state, indicating an excursion was detected in environmental conditions during transit and/or storage of the item 100. Selection of the button 412 may increment the count 400.

The interface can further include a termination button 420, e.g., to indicate that the contents of the receptacle 108 has been fully inventoried and to cause the computing device 120 to store the final counts 400 and 404 along with the identifier 408. In addition, the interface includes a selectable assistive state detection element 424, selection of which initiates the process described herein. In other examples, the element 424 can simply be presented on the display 212, omitting the other logging-related elements shown in FIG. 4.

Figure 4:
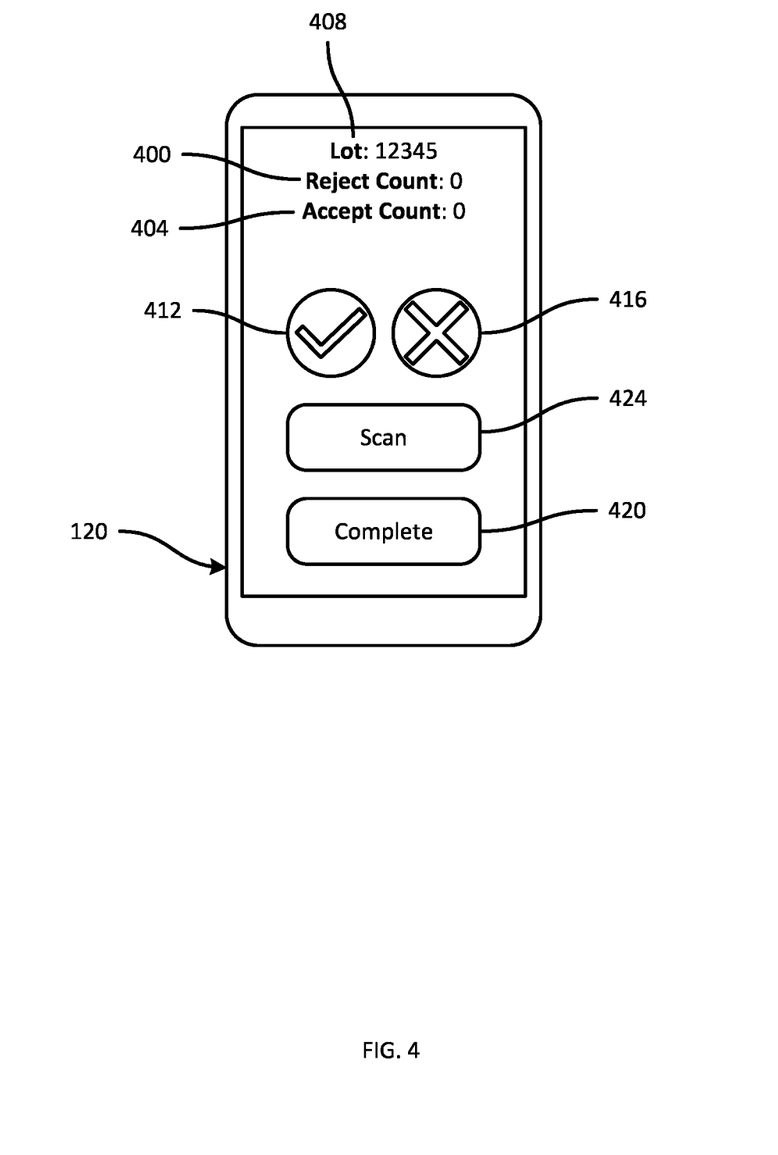
FIG. 4 is a diagram illustrating an example performance of block 305 of the method of FIG. 3.

At block 310, the computing device 120 is configured to determine whether a scan command has been received, e.g., via selection of the element 424 shown in FIG. 4 by an operator of the computing device 120. When the determination at block 310 is affirmative, the computing device 120 proceeds to block 315. At block 315, the processor 200 controls the camera 124 to capture an image, e.g., with a monitoring device 104 placed within a field of view of the camera 124. The scan command can be initiated, for example, in response to the operator of the computing device 120 detecting the sensory prompt 132.

Figure 5:
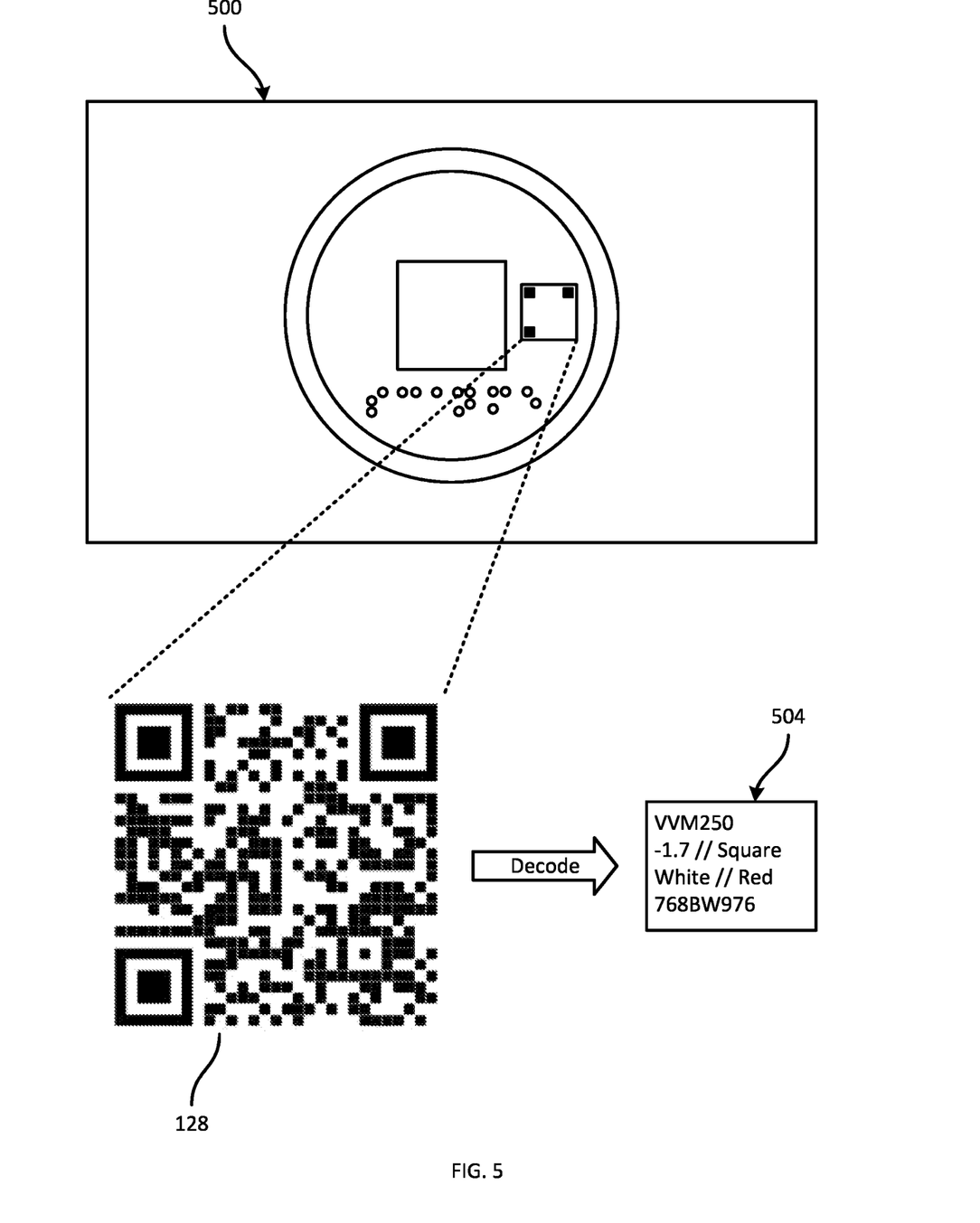
FIG. 5 is a diagram illustrating a further example performance of blocks 315 and 320 of the method of FIG. 3.

The image captured at block 315 therefore depicts at least the monitoring device 104 (and typically a portion of the item 100 carrying the monitoring device 104). FIG. 5 illustrates an example image 500 captured at block 315, depicting the monitoring device 104 shown in FIG. 1.

Returning to FIG. 3, at block 320 the computing device 120 is configured to detect the indicium 128, and decode the indicium 128 to extract one or more state detection parameters therefrom. Any of a variety of suitable barcode detection and decoding algorithms can be implemented by the processor 200 to detect and decode the indicium 128.

The state detection parameters encoded in the indicium 128, and extracted at block 320, enable the computing device 120 to detect a region of interest (ROI) in the image 500 that contains the sensor 116 itself, and to process the ROI to determine the current visual state of the sensor 116. In some examples, the state detection parameters include an identifier of a type of the sensor 116. The memory 204 can store (e.g., as a portion of the application 228 or in a separate repository) a set of additional state detection parameters, indexed according to various sensor types. The computing device 120 can therefore extract the sensor type from the indicium 128, and use the extracted sensor type to perform a lookup operation and retrieve corresponding additional state detection parameters.

In other examples, as shown in FIG. 5, the state detection parameters 504 encoded in the indicium 128 include not only a sensor type identifier (e.g., "VVM250", identifying a particular model of vaccine vial monitor), but also a set of parameters enabling the computing device 120 to locate and process the sensor 116 in the image 500. The parameters define a location of the sensor 116, e.g., relative to the location of the indicium 128 itself. For example, the parameters 504 include the string "−1.7/Square", indicating that the sensor 116 is a square whose center is located to the left (e.g., in a negative direction) of the center of the indicium 128, with a distance between the centers of the sensor 116 and the indicium 128 being approximately 1.7 times the width of the indicium 128 itself (which has already been detected). A wide variety of other parameters can be employed to indicate a location of the sensor 116 relative to the indicium 128. In other examples, the parameters 504 can define a location of the sensor 116, or other properties enabling detection of the sensor 116, independently of the indicium 128 itself. For example, the parameters 504 can specify a shape of the sensor 116, an absolute size of the sensor 116, an aspect ratio of sides of the sensor 116, or any suitable combination of the above.

The parameters 504 also include at least an expected state definition. In this example, the parameters 504 include two state definitions, in the form of the string "White/Red", indicating that the initial state of the sensor 116 has the color white, and an excursion-activated state has the color red. The colors themselves may be specified numerically in other examples (e.g., as RGB triplets, or the like). In other examples, the initial state alone may be specified, such that any color other than that identified in the parameters 504 is assumed to indicate an excursion. The parameters 504 can also include a unique identifier of the monitoring device 104 (e.g., the string "768BW976" in the illustrated example).

The format of the parameters encoded in the indicium 128 may also vary widely. The application 228, in this example, includes instructions defining an expected order, and an expected format, of the parameters 504 (e.g., to the effect that the second line of the parameters 504 is interpreted by the computing device 120 as defining the location of the sensor 116). In other examples, the parameters 504 can include labels for each parameter (e.g., the string "Color=White/Red"), and the order in which parameters are presented may therefore vary so long as the application 228 configures the computing device 120 to detect the labels.

Figure 6:
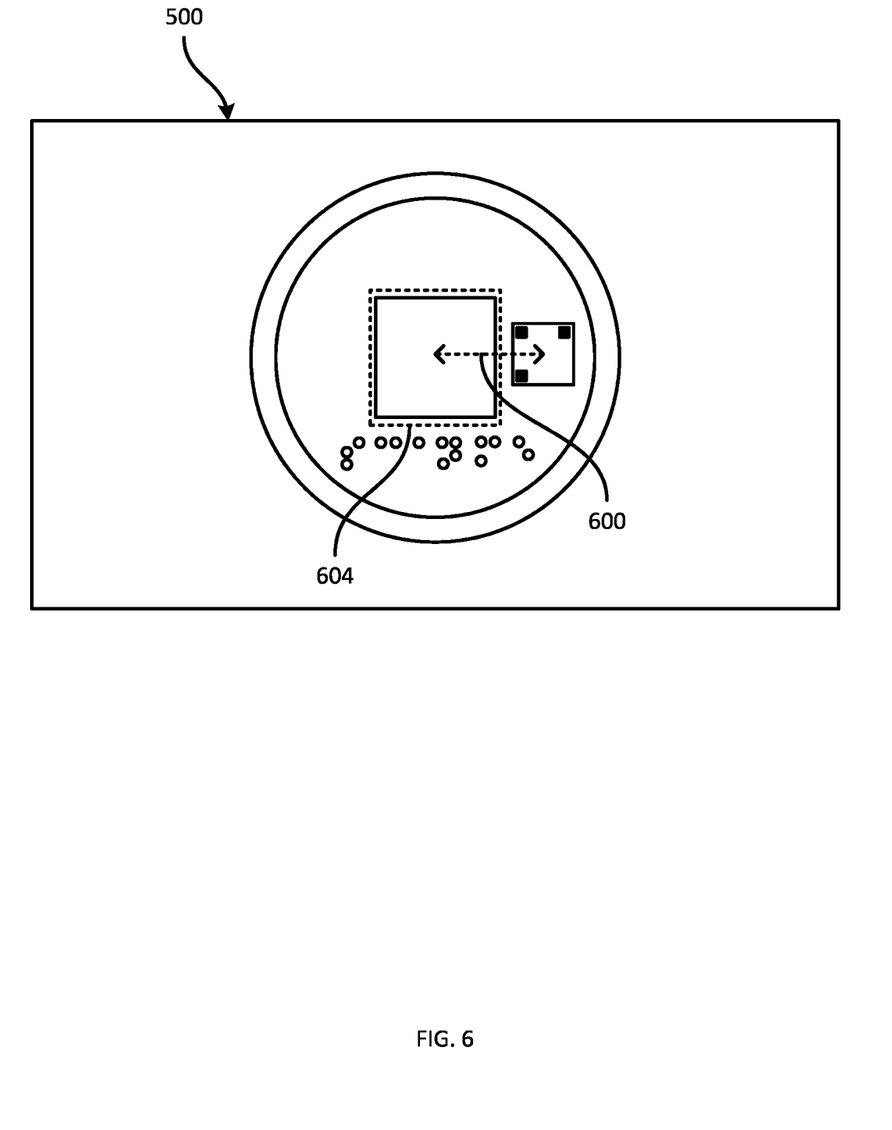
FIG. 6 is a diagram illustrating an example performance of block 325 of the method of FIG. 3.

Returning to FIG. 3, at block 325, the computing device 120 is configured to detect the region of interest defined by the parameters from block 320, from the image captured at block 315. Turning to FIG. 6, for example, the computing device 120 can be configured to search the image 500 for a square centered at a distance 600 from the center of the indicium (as specified in the parameters 504). The computing device 120 therefore detects, in the present example performance of the method 300, an ROI 604 containing the sensor 116. As will be apparent, a variety of algorithms can be implemented to search the image 500 for specific shapes (e.g. edge detection, machine learning-based classifiers, and the like).

Referring again to FIG. 3, at block 330 the computing device 120 is configured to assess the ROI 604 detected at block 325, to determine the current visual state of the ROI, and to determine whether the current visual state matches the expected visual state (e.g., the initial visual state for the relevant model of monitoring device 104). Thus, in this example, the computing device 120 is configured to determine whether a color of the ROI 604 matches the first specified color (white) in the parameters 504. In other examples, the computing device 120 can be configured to determine which color from the parameters 504 the ROI 604 matches.

The determination at block 330 can include determine a similarity metric between the expected state color and the actual color of the ROI 604. For example, the computing device 120 can determine an average color of the ROI 604, and determine the Euclidean distance between that average color and the color specified in the parameters 504. If using a distance-based metric, the computing device 120 may employ color values in a color space such as YUV or CIE (in which Euclidean distance is more likely to align with human perception of color similarity than an RGB-based color space). The distance can then be compared to a predefined threshold to determine whether the colors can be considered to match.

When the determination at block 330 is negative, indicating that the active visual state of the sensor 116 is not the expected state (or, more specifically, matches the excursion-activated state), the computing device 120 proceeds to block 335, to generate an exception notification. When the determination at block 330 is affirmative, on the other hand, the computing device 120 proceeds to block 340, to generate a standard, or acceptance, notification.

The notifications mentioned above serve to indicate which handling action should be taken with respect to the item 100 scanned at block 315. In general, an exception notification indicates to the operator that the item 100 has been subjected to non-compliant environmental conditions, while the standard or acceptance notification indicates that the item 100 has not been exposed to such conditions. The handling actions can include discarding or otherwise rejecting the item following an exception notification, and processing the item 100 for subsequent transit and/or use following an acceptance notification.

Figure 7:
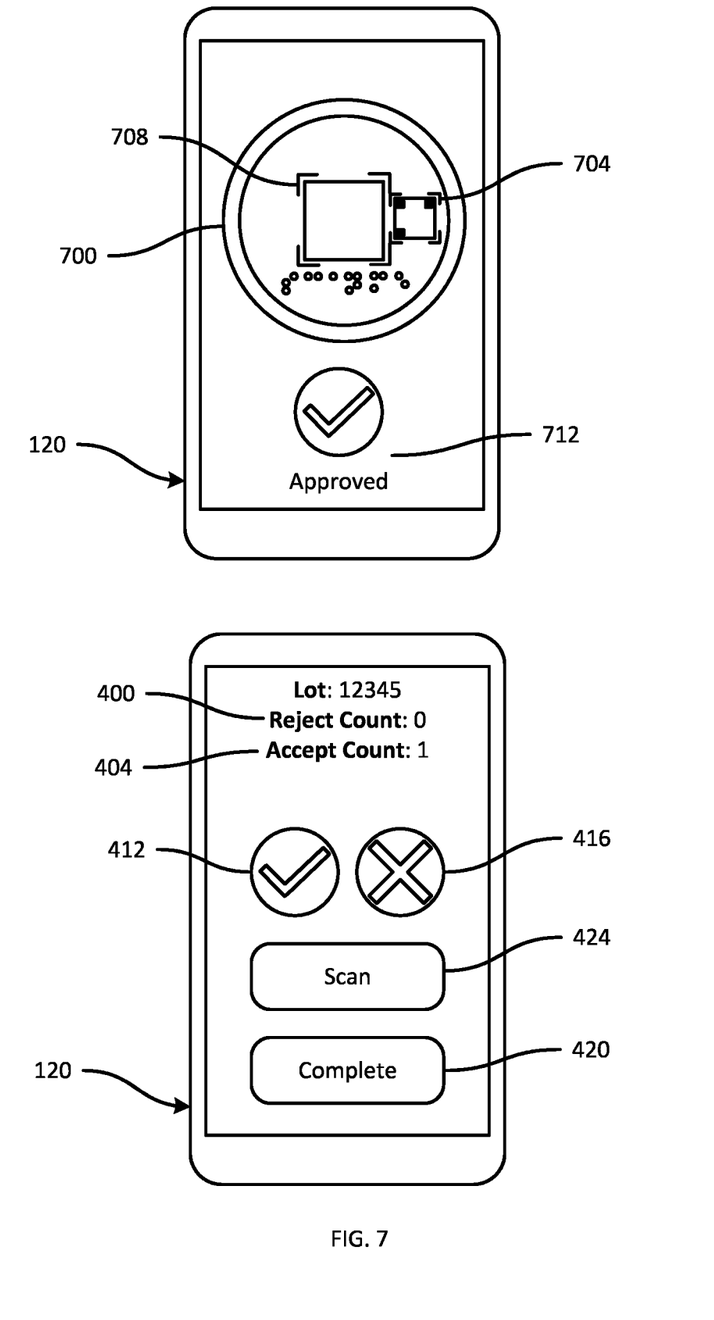
FIG. 7 is a diagram illustrating an example performance of block 340 of the method of FIG. 3.

FIG. 7 illustrates an example acceptance notification. In particular, the computing device 120 can render an interface including at least a portion 700 of the image 500, and optionally including boundaries 704 indicating the locations of the indicium 128 and the ROI, respectively. The computing device 120 can also render an acceptance notification 712, e.g., in the form of graphics and/or text indicating that the scan process is complete and the sensor 116 is in the expected or initial state. The notification can also include generation of an audible message indicating acceptance (e.g., previously recorded and stored as a component of the application 228), a vibration-based output to indicate scan completion, and the like.

Following the notification at block 340, the computing device 120 can be configured to return to the interface originally discussed in connection with FIG. 4, with the acceptance count automatically incremented.

Figure 8:
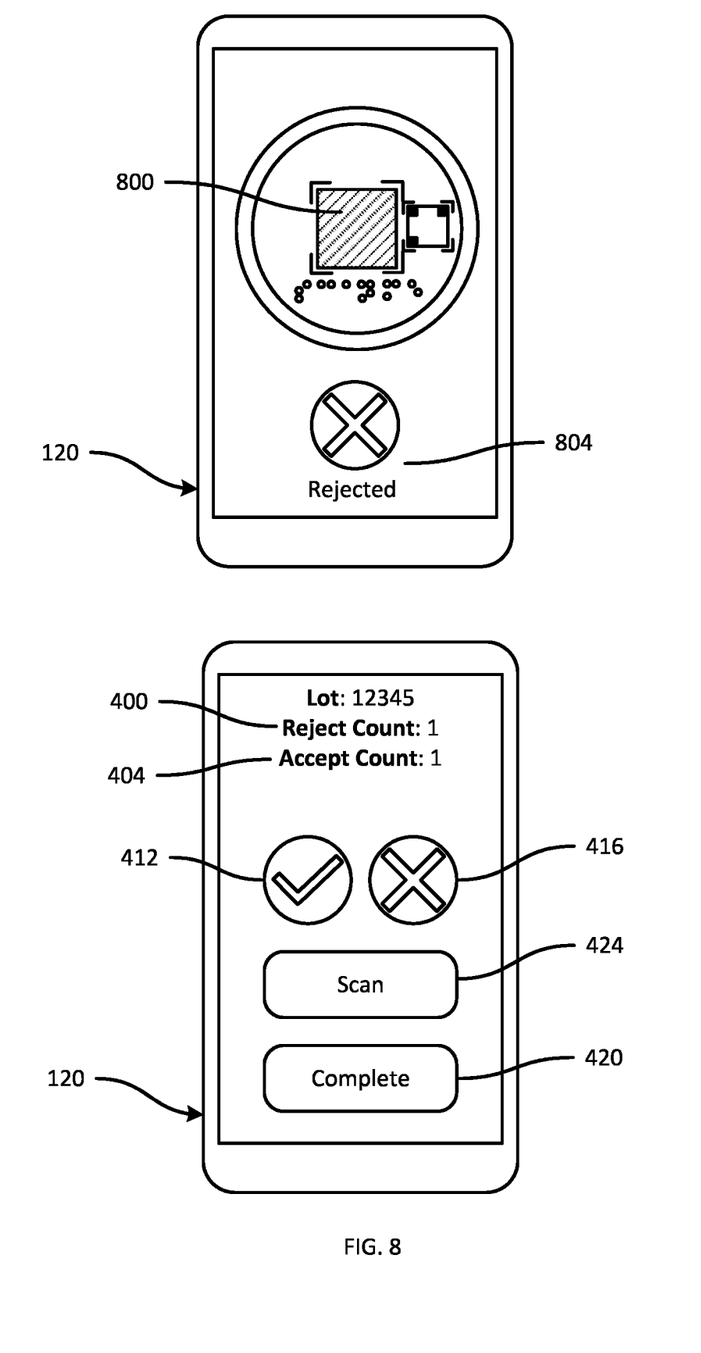
FIG. 8 is a diagram illustrating an example performance of block 335 of the method of FIG. 3.

FIG. 8 illustrates an example exception notification. In particular, the computing device 120 is shown rendering a portion of a captured image on the display, with an ROI 800 having been detected and analyzed as discussed previously. In the illustrated example of FIG. 8, however, the sensor 116 depicted by the ROI 800 has changed color from the initial state (e.g., and currently has the state 104b shown in FIG. 1). The determination at block 330 is therefore negative, and at block 335 the computing device 120 can generate an exception notification, including any one or more of a graphical notification 804 (e.g., including an icon and accompanying text indicating that the item 100 should be rejected), an audible message indicating rejection, a vibration-based output, or the like. When the notification includes haptic output, exception and acceptance notifications can be distinguished from one another by any one or more of vibration intensity, pattern, duration, and the like. As shown in FIG. 8, following generation of the exception notification, the computing device 120 can return to the previous interface, and automatically update the rejection count 400.

Referring again to FIG. 3, following the generation of a notification via block 335 or 340, the computing device 120 can optionally proceed to block 345. When logging data is being stored (which, as noted earlier, is not strictly necessary in order to implement assistive state detection), at block 345 the computing device 120 can return log data, such as the updated counts noted above in connection with FIGS. 7 and 8, to the primary interface shown in FIG. 4. At block 355, logging data can be stored in the memory 204 and/or transmitted to another computing device for storage in a repository. In other examples, block 355 can be performed, for a plurality of individual item scans, in response to selection of the termination element 420 mentioned earlier. That is, the performance of blocks 310 to 345 can be repeated a plurality of times before block 355 is performed.

As also shown in FIG. 3, when the determination at block 310 is negative (i.e., when assistive state detection is not requested by the operator of the computing device 120), the computing device 120 can optionally receive manual logging input at block 350. The logging input can be received as, for example, selections of the elements 412 and 416 for one or more monitoring devices 104, following visual inspection of the monitoring devices 104 by the operator of the computing device 120.

As will be apparent to those skilled in the art, the above functionality can be implemented for a wide variety of form factors of monitoring device 104, beyond the vial monitoring form factor illustrated herein. In further examples, a monitoring device 104 can include more than one sensor. For example, a monitoring device 104 can include a first sensor 116 for detecting whether an upper temperature threshold has been exceeded, and a second sensor 116 for detecting whether a lower temperature threshold has been exceeded. In other examples, the distinct sensors can monitor different environmental conditions (e.g., temperature and humidity, or the like). In such examples, the indicium 128 can contain two (or more, dependent on the number of sensors 116) distinct sets of parameters, each corresponding to one of the sensors.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, the method comprising:
capturing, via a camera of a computing device, an image of a monitoring device including a machine-readable indicium and a sensor, the sensor presenting an active one of a set of predefined visual states and being separate and spaced away from the machine-readable indicium;
detecting, within the image, the machine-readable indicium disposed on the monitoring device;
determining, from the machine-readable indicium, a state detection parameter, the state detection parameter specifies a distance from a center of the machine readable indicium to the sensor;
selecting, according to the distance, at least portion of the image containing the sensor and determining the active state presented by the sensor;
controlling an output assembly of the computing device to present a handling notification based on the determined active state.

2. The method of claim 1, further comprising, prior to controlling the camera: receiving an input command, via an input assembly of the computing device, to initiate assistive state detection.

3. The method of claim 2, wherein the input command includes selection of an element presented via the output assembly.

4. The method of claim 1, wherein the visual states each indicate exposure of the monitoring device to associated environmental conditions.

5. The method of claim 1, wherein the state detection parameters include a type of the monitoring device; and wherein the method further comprises retrieving a region of interest location and an expected state definition, according to the type of the monitoring device.

6. The method of claim 1, wherein the state detection parameters include a region of interest location and an expected state definition.

7. The method of claim 1, wherein controlling the output assembly to present a handling notification includes:
storing notification definitions for each visual state; and
retrieving one of the notification definitions based on the determined active state.

8. The method of claim 7, wherein the handling notification includes an instruction to accept an item carrying the monitoring device in response to determining a first active state.

9. The method of claim 7, wherein the handling notification includes an instruction to reject an item carrying the monitoring device in response to determining a second active state.

10. A computing device, comprising:
a camera;
an output assembly; and
a processor connected with the camera and the output assembly, the processor configured to:

capture, via the camera, an image of a monitoring device including a machine-readable indicium and a sensor, the sensor presenting an active one of a set of predefined visual states and being separate and spaced away from the machine-readable indicium;

detect, within the image, the machine-readable indicium disposed on the monitoring device;

decode, from the machine-readable indicium, a state detection parameter, the state detection parameter specifies a distance from a center of the machine readable indicium to the sensor;

select, according to the distance, at least a portion of the image containing the sensor and determining the active state presented by the sensor;

control the output assembly to present a handling notification based on the determined active state.

11. The computing device of claim 10, further comprising an input assembly;

wherein the processor is further configured, prior to controlling the camera, to receive an input command, via the input assembly, to initiate assistive state detection.

12. The computing device of claim 11, wherein the input command includes selection of a element presented via the output assembly.

13. The computing device of claim 10, wherein the visual states each indicate exposure of the monitoring device to predefined environmental conditions.

14. The computing device of claim 10, wherein the state detection parameters include an indicator of the type of monitoring device; and wherein the processor is further configured to retrieve a region of interest location and an expected state definition, according to type indicator.

15. The computing device of claim 10, wherein the state detection parameters include a region of interest location and an expected state definition.

16. The computing device of claim 10, wherein the processor is configured, to control the output assembly to present a handling notification, to:

store notification definitions for each visual state; and retrieve one of the notification definitions based on the determined active state.

17. The computing device of claim 16, wherein the handling notification includes an instruction to accept an item carrying the monitoring device in response to determining a first active state.

18. The computing device of claim 16, wherein the handling notification includes an instruction to reject an item carrying the monitoring device in response to determining a second active state.

* * * * *